United States Patent
Jidhage et al.

(10) Patent No.: US 10,516,491 B2
(45) Date of Patent: Dec. 24, 2019

(54) METHOD FOR CALIBRATING AN ANTENNA SYSTEM, CONTROL DEVICE, COMPUTER PROGRAM AND COMPUTER PROGRAM PRODUCTS

(71) Applicant: Telefonaktiebolaget LM Ericsson (publ), Stockholm (SE)

(72) Inventors: Henrik Jidhage, Mölndal (SE); Christer Engdahl, Särö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/307,157

(22) PCT Filed: Jun. 8, 2016

(86) PCT No.: PCT/EP2016/062996
§ 371 (c)(1),
(2) Date: Dec. 5, 2018

(87) PCT Pub. No.: WO2017/211408
PCT Pub. Date: Dec. 14, 2017

(65) Prior Publication Data
US 2019/0149250 A1    May 16, 2019

(51) Int. Cl.
*H04B 7/06* (2006.01)
*H04B 17/12* (2015.01)
*H04B 17/19* (2015.01)

(52) U.S. Cl.
CPC .......... *H04B 17/12* (2015.01); *H04B 7/0617* (2013.01); *H04B 17/19* (2015.01)

(58) Field of Classification Search
CPC ...... H04B 7/024; H04B 7/0617; H04B 17/11; H04B 17/12; H04B 17/14; H04B 17/19;
(Continued)

(56) References Cited

U.S. PATENT DOCUMENTS

2014/0295909 A1* 10/2014 Ouchi ................. H04W 52/242
455/522
2019/0116594 A1* 4/2019 Kwak ............... H04W 72/0453

OTHER PUBLICATIONS

International Search Report and Written Opinion of the International Searching Authority, PCT/EP2016/062996, dated Feb. 14, 2017, 11 pages.
(Continued)

*Primary Examiner* — Thanh C Le
(74) *Attorney, Agent, or Firm* — Sage Patent Group (57) ABSTRACT

A method of calibrating an antenna system comprising a number of antenna elements is provided. The method comprises transmitting and measuring at least for first and second reference antenna elements, thereby obtaining first and second sets of corresponding number of measurement values; calculating, for a first type of beamforming and for each calibration antenna element j a correction value—$\Delta R_{ij}^{k,Type\ 1}$, thereby obtaining a first part of a correction matrix; calculating, for a second type of beamforming and for each branch j a correction value $\Delta R_{i,j}^{Type\ 2}$, thereby obtaining a second part of the correction matrix; performing an optimization procedure using as input the correction matrix thereby obtaining, for each row of the correction matrix, a respective optimized constant, and calculating a compensation value $\Delta r_i$ for each antenna element based on the respective optimized constant.

17 Claims, 6 Drawing Sheets

(58) Field of Classification Search
CPC .... H04B 17/21; H04W 52/04; H04W 72/042; H04L 27/2601
See application file for complete search history.

(56) References Cited

OTHER PUBLICATIONS

Wei Hao et al, Reciprocity Calibration for Massive MIMO Systems by Mutual Coupling between Adjacent Antennas, 2016 IEEE 83rd Vehicular Technology Conference (VTC Spring), IEEE, May 15, 2016 (May 15, 2016), pp. 1-5, XP032918677, 5 Pages.

Wei Hao et al, Mutual Coupling Calibration for Multiuser Massive MIMO Systems, IEEE Transactions on Wireless Communications, IEEE Service Center, Piscataway, NJ, US, vol. 15, No. 1, Jan. 1, 2016 (Jan. 1, 2016, pp. 606-619, XP011591620, 14 Pages.

C. Shipley et al., "Mutual Coupling-Based Calibration of Phased Array Antennas," Proceedings 2000 IEEE International Conference on Phased Array Systems and Technology, Dana Point, CA, USA, May 21-25, 2000, pp. 529-532.

Joao Vieira et al, Reciprocity calibration methods for Massive MIMO based on antenna coupling, Lund University, Sweden, IEEE Globecom 2014—Wireless Communications Symposium, Dec. 8, 2014, pp. 1-5, Austin, Texas, USA, 6 Pages.

Herbert M. Aumann et al, Phased Array Antenna Calibration and Pattern Prediction Using Mutual Coupling Measurements, 1989 IEEE, Transactions on Antennas and Propagation, vol. 37, No. 7. Jul. 1989, 7 Pages.

\* cited by examiner

METHOD FOR CALIBRATING AN ANTENNA SYSTEM, CONTROL DEVICE, COMPUTER PROGRAM AND COMPUTER PROGRAM PRODUCTS

CROSS REFERENCE TO RELATED APPLICATIONS

This application is a 35 U.S.C. § 371 national stage application of PCT International Application No. PCT/EP2016/062996 filed on Jun. 8, 2016, the disclosure and content of which is incorporated by reference herein in its entirety.

TECHNICAL FIELD

The technology disclosed herein relates generally to the field of antenna systems, and in particular to a method of calibrating an antenna system, a control device, computer program and computer program products.

BACKGROUND

Having calibrated antenna systems are becoming increasingly important, in particular in future wireless communication systems, since the number of branches increases and since various beamforming technologies are to be supported. Future Advanced Antenna Systems is intended to provide both "standard beamforming" such as cell specific beamforming and user equipment (UE) beamforming in a controlled direction, as well as reciprocity based beamforming.

It is important that an antenna system is properly calibrated in order to ensure highest possible performance. A challenge in this regards is that the antenna system should support different types of beamforming, having different requirements.

SUMMARY

An objective of embodiments herein is to provide methods and nodes meeting the different needs of different types of beamforming. A particular objective is to improve calibration accuracy for antenna systems, in particular for antenna systems wherein there is a need to calibrate the antenna system in view of different types of beamforming. This objective, and others, is achieved by the method, network node, computer programs and computer program products according to the appended independent claims, and by the embodiments according to the dependent claims.

The objective is according to an aspect achieved by a method of calibrating an antenna system comprising a number of antenna elements. The method is performed in a control device and comprises:

transmitting a signal from a first reference antenna element selected among the antenna elements, measuring the signal in two or more calibration antenna elements selected among the remaining antenna elements, and obtaining a first set of corresponding number of measurement values, repeating the transmitting and measuring at least for a second reference antenna element different than the first reference antenna element, thereby obtaining a second set of corresponding number of measurement values, calculating, for a first type of beamforming and for each calibration antenna element j a correction value $\Delta R_{ij}^{k, Type\ 1}$, based on the at least first and second sets of measurement values, thereby obtaining a first part of a correction matrix comprising for row i correction values for calibration antenna elements j relative antenna element k with antenna element i as the reference antenna element, calculating, for a second type of beamforming and for each branch j a correction value $\Delta R_{i,j}^{Type\ 2}$, based on the at least first and second sets of measurement values, thereby obtaining a second part of the correction matrix comprising for row i correction values for branch j with antenna element i as the reference antenna element, performing an optimization procedure using as input the correction matrix, wherein each column of the first part of the correction matrix, except one, is multiplied with a respective constant $c_i$, i={1, . . . , N} and each column of the second part of the correction matrix is multiplied with a respective constant $c_i$, i={N+1, . . . , 2N} thereby obtaining, for each row of the correction matrix, a respective optimized constant $c_i^{opt}$, and calculating a compensation value $\Delta r_i$ for each antenna element based on the respective optimized constant $c_i^{opt}$.

The method brings about several advantages. The method enables calibration of both standard beamforming and reciprocity beamforming. The use of a single method for different types of beamforming gives an efficient calibration of antenna systems. Further, the method also enables a prioritization of the calibration accuracy between the standard beamforming and the reciprocity beamforming.

The objective is according to an aspect achieved by a computer program for a control device for calibrating an antenna system. The computer program comprises computer program code, which, when executed on at least one processor on the control device causes the control device to perform the method as above.

The objective is according to an aspect achieved by a computer program product comprising a computer program as above and a computer readable means on which the computer program is stored.

The objective is according to an aspect achieved by a control device for calibrating an antenna system comprising a number of antenna elements. The control device is configured to:

transmit a signal from a first reference antenna element selected among the antenna elements, measure the signal in two or more calibration antenna elements selected among the remaining antenna elements, and obtaining a first set of corresponding number of measurement values, repeat the transmitting and measuring at least for a second reference antenna element different than the first reference antenna element, thereby obtaining a second set of corresponding number of measurement values, calculate, for a first type of beamforming and for each calibration antenna element j a correction value $\Delta R_{ij}^{k, Type\ 1}$, based on the at least first and second sets of measurement values, thereby obtaining a first part of a correction matrix comprising for row i correction values for calibration antenna elements j relative antenna element k with antenna element i as the reference antenna element, calculate, for a second type of beamforming and for each branch j a correction value $\Delta R_{i,j}^{Type\ 2}$, based on the at least first and second sets of measurement values, thereby obtaining a second part of the correction matrix comprising for row i correction values for branch j with antenna element i as the reference antenna element, perform an optimization procedure using as input the correction matrix, wherein each column of the first part of the correction matrix, except one, is multiplied with a respective constant $c_i$, $i=\{1, \ldots, N\}$ and each column of the second part of the correction matrix is multiplied with a respective constant $c_i$, $i=\{N+1, \ldots, 2N\}$ thereby obtaining, for each row of the correction matrix, a respective optimized constant $c_i^{opt}$, and calculate a compensation value $\Delta r_i$ for each antenna element based on the respective optimized constant $c_i^{opt}$.

Further features and advantages of the embodiments of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 1:
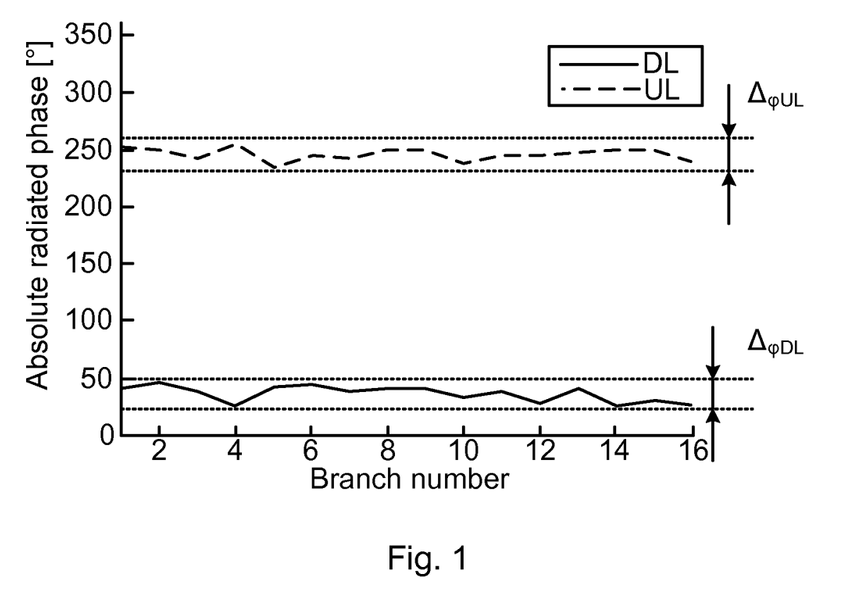
FIG. 1 illustrates relative downlink/uplink calibration for standard beamforming.

FIG. 1 illustrates relative downlink (DL)/uplink (UL) calibration for standard beamforming, and in particular absolute radiated phase (y-axis) for a number of branches (x-axis). The figure shows an example of phase difference between sixteen elements, in uplink $\Delta\varphi_{UL}$ and in downlink $\Delta\varphi_{DL}$. The standard beamforming will require amplitude and phase accuracy between DL and/or UL branches.

Figure 2:
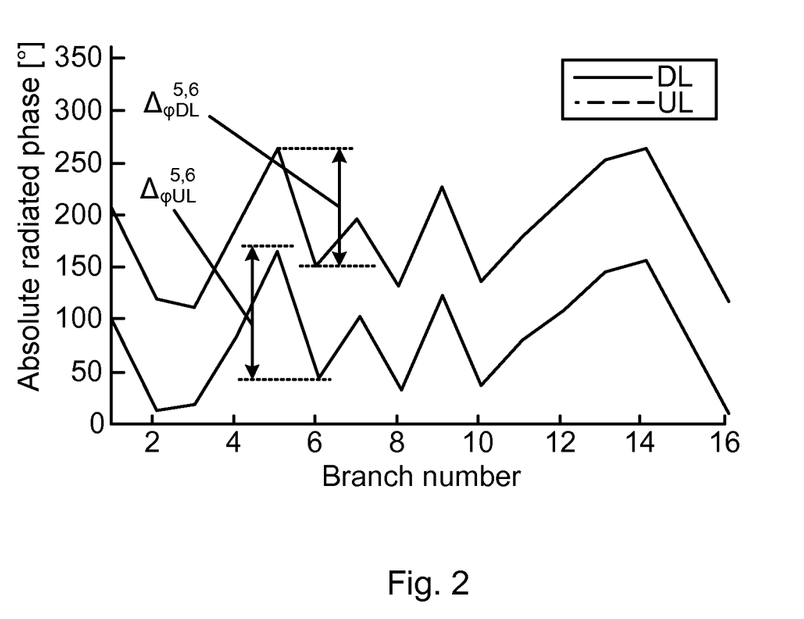
FIG. 2 illustrates relative downlink-to-uplink calibration for reciprocity beamforming.

FIG. 2 illustrates relative DL-to-UL calibration for reciprocity beamforming. The figure shows an example on phase difference $\Delta\varphi_{DL}^{5,6}$, $\Delta\varphi_{UL}^{5,6}$ in downlink and uplink between two antenna elements (fifth and sixth antenna elements). Reciprocity based beamforming will require relative DL-to-UL calibration, i.e. that the difference between transmission elements is the same as the difference between reception elements.

Briefly, according to embodiments herein, mutual coupling calibration measurements are performed and the final calibration corrections of different beamforming methods are optimized together with weights that have been measured according to a method of calibrating an antenna system.

Figure 3:
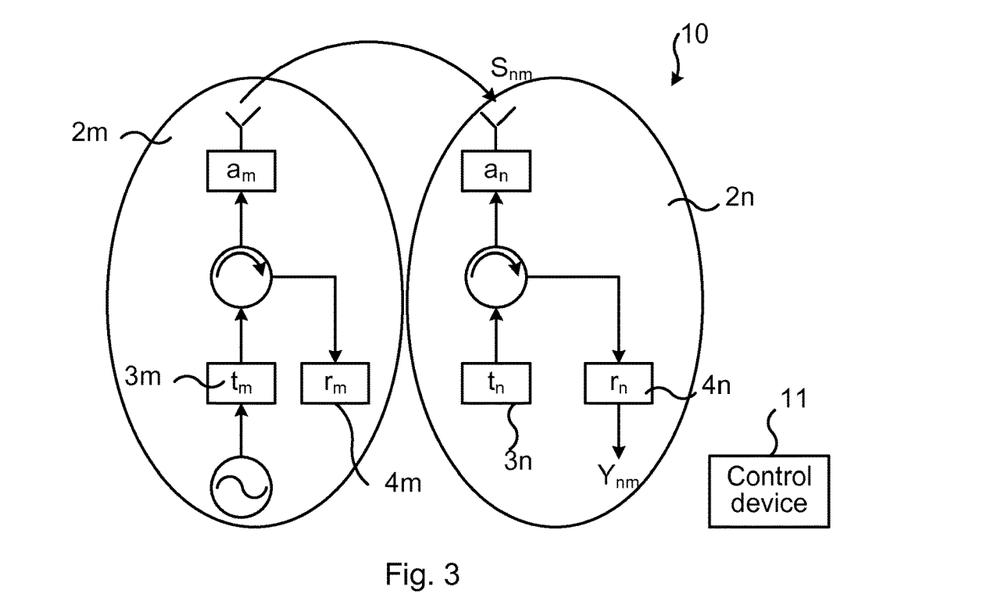
FIG. 3 illustrates an active antenna system.

FIG. 3 illustrates an active antenna system. The antenna system 10 comprises a number of antenna branches 2m, 2n (two shown in the figure), each comprising e.g. transmitting circuitry, receiving circuitry, antenna feed lines etc. In FIG. 3 a first antenna branch 2m and a second antenna branch 2n are shown. The first antenna branch 2m comprises a first transmitter 3m a first receiver 4m, and a first antenna feed line being represented by variable $a_m$. The first transmitter 3m and the first receiver 4m can be represented by the complex variables $t_m$ and $r_m$, respectively. The first antenna branch 2m may comprise further components and circuitry, e.g. a circulator as shown in FIG. 3. The second antenna branch 2n comprises a second transmitter 3n, a second receiver 4n, and a second antenna feed line represented by variable $a_n$. The second transmitter 3n and the second receiver 4n can be represented by the complex variables $t_n$ and $r_n$, respectively. The second antenna branch 2n may comprise further components and circuitry, e.g. a circulator as shown in FIG. 3. A signal $Y_{nm}$ sent from the first transmitter 4m of the first antenna branch 2m can be measured with the second receiver 4n of the second antenna branch 2n. The received signal $Y_{nm}$ can then be written as:

$$Y_{nm} = t_m \cdot a_m \cdot S_{nm} \cdot a_n \cdot r_n, \forall n \neq m, \qquad [1],$$

wherein the antenna is represented by a coupling matrix $S_{nm}$ and by the antenna feed lines $a_m$ and $a_n$ of the respective antenna branches 2m, 2n.

As mentioned, the transmitter 3m and receiver 4m can be represented by the complex variables $t_m$ and $r_m$. These variables consist of the original state (uncalibrated) variables $t_{m0}$ and $r_m$ and calibration correction factors $\Delta t$ and $\Delta r$ according to the following equations:

$$t_m = t_{m0} \cdot \Delta t_m, \qquad [2]$$

$$r_m = r_{m0} \cdot \Delta r_m, \qquad [3]$$

It is noted that the corrections are time dependent. Measurements may be performed with "old" corrections. For instance, if a first correction is made and a new measurement shows that the result is still not according to a desired target value, then a new calibration is made, and the new correction may include the previous correction. Any new correction is thus based on the existing correction (if any).

The equations below show how a state variable $t_m$ ($t_1$) which included an original compensation $\Delta t_m(t_1)$ is used to calculate a new correction $\Delta t_m(t_2)$.

$$t_m(t_1) = t_{m0} \cdot \Delta t_m(t_1)$$

$$t_m(t_2) = (t_{m0} \cdot \Delta t_m(t_1)) \cdot \Delta t_m(t_2)$$

The desired state is that all radiated (in farfield) or received (from farfield) signals have the same amplitude and phase, i.e. the ratio between the state variables of any two antenna branches is ideally equal to 1. The error $\varepsilon$ (complex) between branches m and n can therefore be calculated according to below equations [4] and [5] for downlink (DL) and uplink (UL), respectively.

$$\varepsilon_{mn}^{DL} = \frac{t_m \cdot a_m}{t_n \cdot a_n} \forall m \neq n \qquad [4]$$

-continued $$\varepsilon_{mn}^{UL} = \frac{r_m \cdot a_m}{r_n \cdot a_n} \forall m \neq n \quad [5]$$

The relative downlink (DL) to uplink (UL) error $\varepsilon_{mn}^{DLUL}$ (complex) between branches m and n can be calculated according to below equation [6]:

$$\varepsilon_{mn}^{DLUL} = \frac{t_m \cdot a_m}{t_n \cdot a_n} \bigg/ \frac{r_m \cdot a_m}{r_n \cdot a_n} = \frac{t_m \cdot r_n}{t_n \cdot r_m}, \forall m \neq n \quad [6]$$

The error $\varepsilon_{mn}^{DLUL}$ can be used to calculate a correction $\Delta r_n$ for uplink branch n according to below equation [7]:

$$\Delta r_n = 1/\varepsilon_{mn}^{DL} \quad [7]$$

Correction $\Delta R_{ij}$ for uplink branch j using element i as reference element can be determined according to below equation [8]. This means in terms of uplink calibration that element i is transmitting and that elements j is receiving the transmitted signal.

$$\Delta R_{ij} = \frac{Y_{ij}}{Y_{ji}}, \forall i \neq j \quad [8]$$

Figure 4:
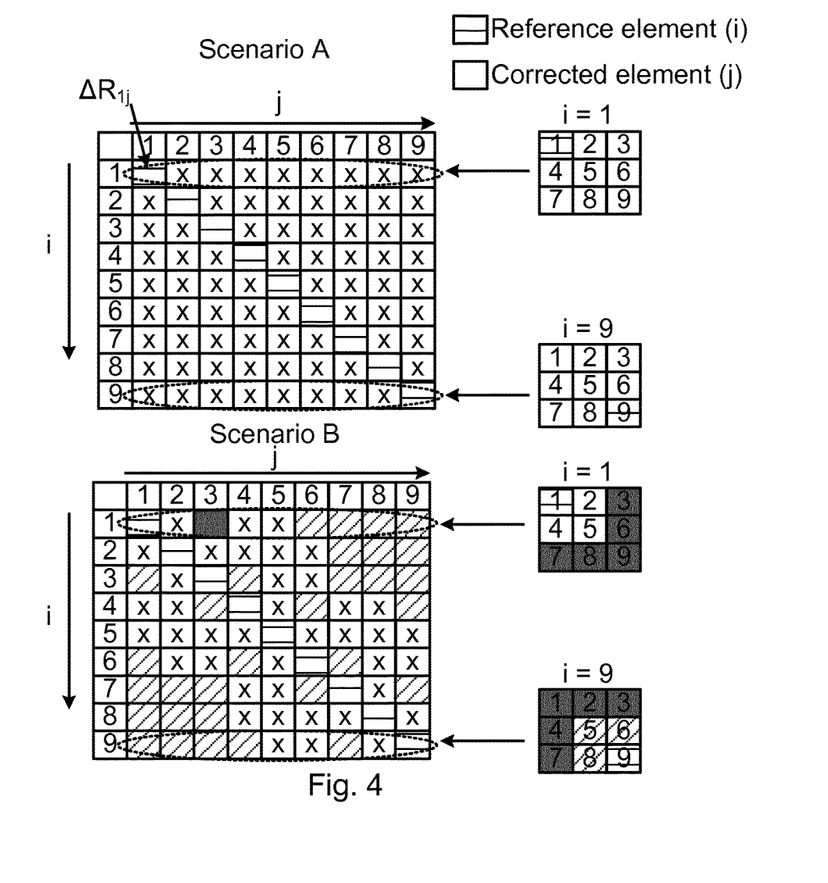
FIG. 4 illustrates two different measurement scenarios for relative beamforming.

FIG. 4 illustrates two different measurement scenarios, and in particular calibration scenarios for a 3×3 element array (these exemplary arrays shown at rightmost part of FIG. 4). In scenario A (uppermost part of FIG. 4) measurements are performed for a signal transmitted from the reference element and received by all other elements. The below equations [9] and [10] can then be used for calculating the correction for element j relative element k using element i as reference element.

$$\Delta T_{ij}^k = \frac{t_k^i}{t_j^i} = \frac{Y_{ik} \cdot S_{ij}}{S_{ik} \cdot Y_{ij}} \forall i \neq j, k \quad [9]$$

$$\Delta R_{ij}^k = \frac{r_k^i}{r_j^i} = \frac{Y_{ki} \cdot S_{ji}}{S_{ki} \cdot Y_{ji}} \forall i \neq j, k \quad [10]$$

For instance, for the 3×3 element array (right-hand side of FIG. 4) for scenario A, with reference element i=1, a signal is sent from the reference element 1 towards all other elements of the 3×3 element array. Measurements are then made in the other elements, i.e. the elements to be corrected in a calibration procedure (these elements being denoted "corrected elements" in FIG. 4, and also calibration elements herein). The resulting measurement values are put into a measurement matrix. A signal sent from reference element 1 is received by corrected element 2, element 3, element 4, . . . , and element 9 and measured in the corresponding antenna chains. The signal sent from element 1 may, for instance, be more phase shifted as received by the element 3, than as received by the element 9. This measurement procedure may then be repeated using each element as reference element in sequence.

In scenario B measurements are performed from the reference branch to the adjacent branches. For instance, for the exemplifying 3×3 element array and using branch 1 as reference branch the signal sent from the reference branch 1 is measured as received only by adjacent branches 2, 4 and 5.

The different measurement scenarios A, B may be chosen depending on the particular circumstances at hand. For instance, a decision for choosing one of the measurement scenarios may be based on signal-to-noise ratio (SNR) and/or difficulties to predict the coupling matrix $s_{nm}$ at larger distances. This renders the calibration method according to the various embodiments described herein adaptable for the particular application at hand. For instance, the time needed for the measurements can be adapted, e.g. the measurement time is reduced if fewer corrected elements are used. On the other hand, the more measurements, the more accurate is the resulting calibration of the antenna system 10.

Calibration for standard beamforming will generate a similar measurement matrix, as will be described next.

Figure 5:
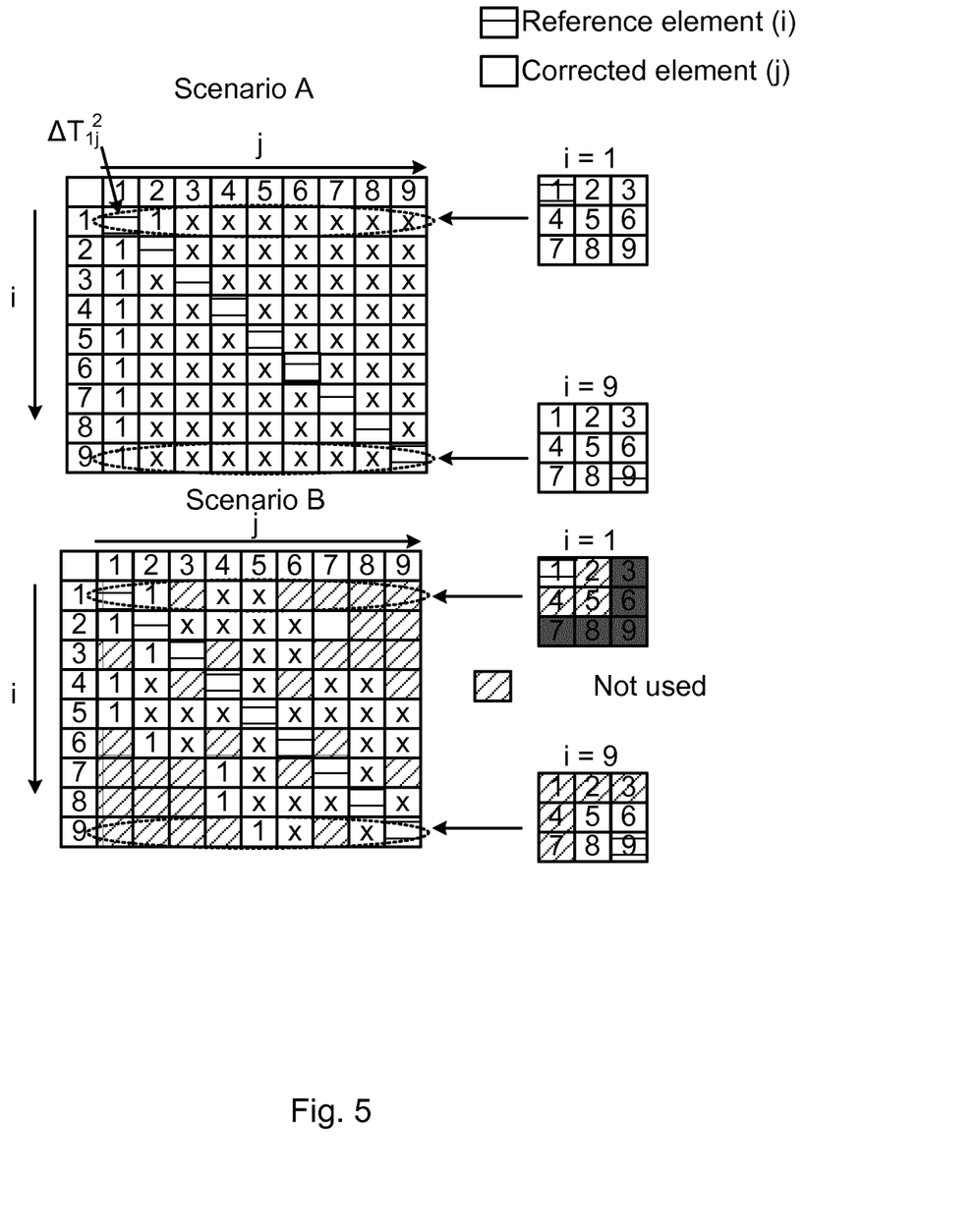
FIG. 5 illustrates two different measurement scenarios for standard beamforming.

FIG. 5 illustrates scenarios for the standard beamforming corresponding to the scenarios of FIG. 4. In scenario A (uppermost part of FIG. 5) measurements are performed for a signal transmitted from the reference element and received by all other elements. The above equations [9] and [10] can then be used for calculating the correction for element j relative element k using element i as reference element.

For instance, for the 3×3 element array (right-hand side of FIG. 5) for scenario A, with reference element i=1, a signal is sent from the reference element 1 towards all other elements of the 3×3 element array. Measurements are then made in the other elements, i.e. the elements to be corrected in a calibration procedure (these elements being denoted "corrected element" in FIG. 5, and also calibration elements herein). The resulting measurement values are put into a measurement matrix. A signal sent from reference element 1 is received by corrected element 2, corrected element 3, corrected element 4, . . . , and corrected element 9 and measured in the corresponding antenna chains. The signal sent from element 1 may, for instance, be more phase shifted as received by the element 3, than as received by the element 9. This measurement procedure may then be repeated using each element as reference element in sequence.

In scenario B measurements are performed from the reference element to the adjacent branches. For instance, for the exemplifying 3×3 element array and using branch 1 as reference element the signal sent from the reference branch 1 is measured as received only by adjacent branches 2, 4 and 5.

As noted before, the different measurement scenarios A, B may be chosen depending on the particular circumstances at hand.

For the reciprocity based beamforming as well as for the standard beamforming, measurements can result in an over determined number of corrections, which can reduce the uncertainty of potential measurement errors and/or S-matrix errors if corrections are managed in a proper way.

A method meeting the different needs of different beamforming technologies is provided herein. Correction data from standard beamforming calibration are combined with the corrections of the relative beamforming calibration.

Figure 6:
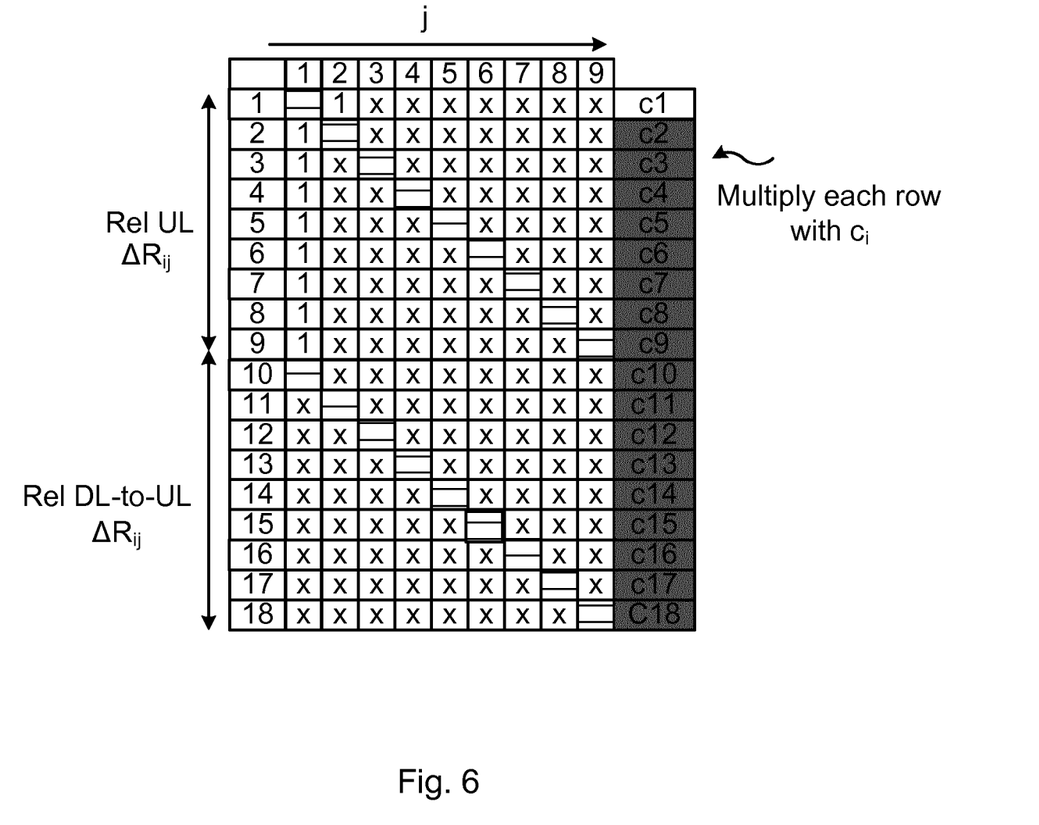
FIG. 6 illustrates a mathematical operation.

FIG. 6 illustrates a mathematical operation. In the standard beamforming, each row of the measurement matrix (e.g. the results of performing measurements according to Scenario A of FIG. 5) is multiplied with a constant, $c_i$ as shown at rows 1-9 of FIG. 6, and as indicated by "REL UL $\Delta R_{ij}$". For the reciprocity based beamforming, each column of the measurement matrix (e.g. the results of performing measurements according to Scenario A of FIG. 4) is multiplied with a constant, $c_i$ as shown at rows 10-18 of FIG. 6 and as indicated by "REL DL-to-UL $\Delta R_{ij}$".

After the multiplications, an optimization procedure may be applied. For instance, a least square optimization can then be performed according to below expression [11] in order to find the proper $c_i$, i=1-18 for the illustrated case.

$$\min_{c_i, i=1 \ldots 2N} \left( \sum_{j=1}^{2N} \sum_{a,b=1}^{2N} |\Delta T_{aj} \cdot c_a - \Delta T_{bj} \cdot c_b|^2 \right), \quad [11]$$

wherein $\Delta T_{aj}$ is the correction value in downlink for element j relative element a. Based on the optimized $c_i$ values, it is possible to calculate an optimized, in this case averaged, compensation term $\Delta r_i$ according to below equation [12]:

$$\Delta r_i = \frac{\sum_{j=1}^{2N} \Delta RR_{ij} \cdot c_i}{2N}, \quad [12]$$

It is possible that the requirement for standard beamforming calibration and reciprocity based calibration are different. Therefore, in various embodiments, if one of the requirements is more stringent than the other it is possible to prioritize the least square error of these weights. This is however not explicitly demonstrated in the figures or equations.

The various embodiments and features that have been described may be combined in many different ways, also others than explicitly mentioned herein. In the following some such combinations are given, with reference first to FIG. 7.

Figure 7:
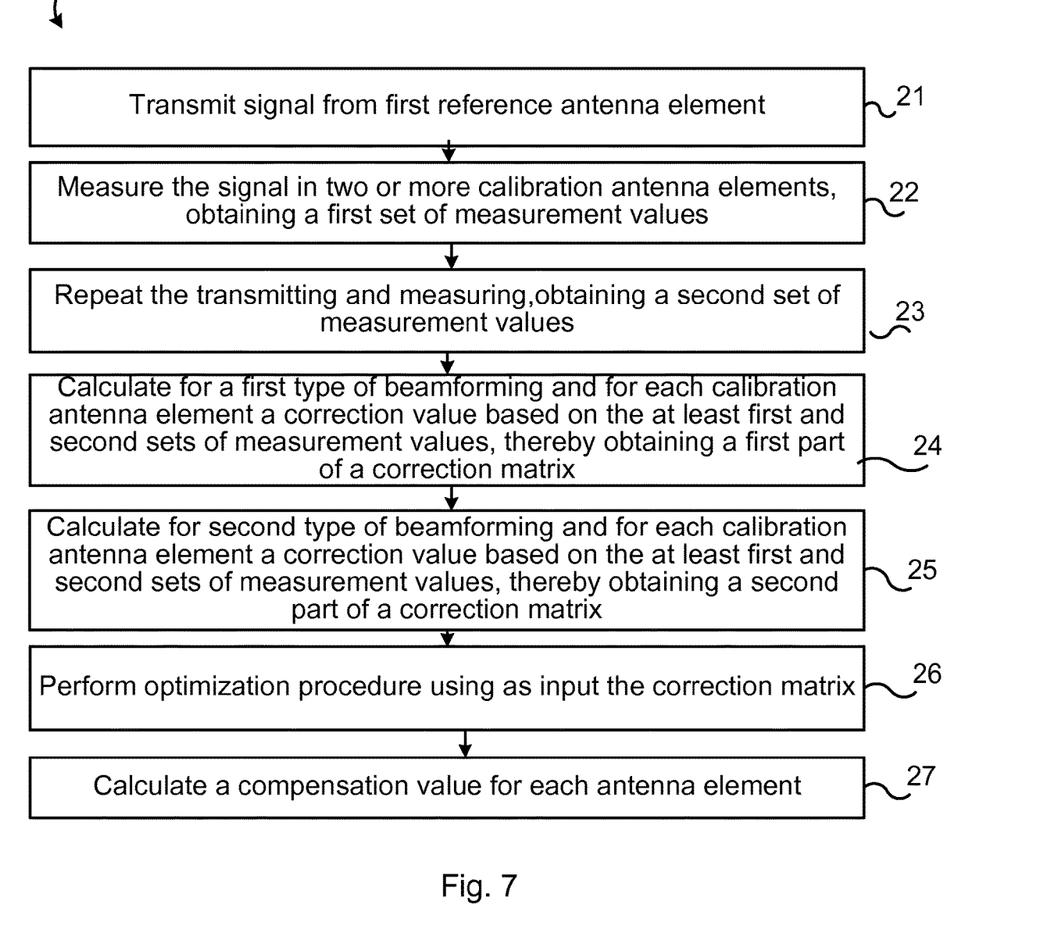
FIG. 7 illustrates a flow chart over steps of an embodiment of a method in a control device in accordance with the present teachings.

FIG. 7 illustrates a flow chart over steps of an embodiment of a method in accordance with the present teachings. The method 20 of calibrating an antenna system 10 comprising a number of antenna elements may be performed in a control device 11.

The method 20 comprises transmitting 21 a signal from a first reference antenna element selected among the antenna elements.

The method 20 comprises measuring 22 the signal in two or more calibration antenna elements selected among the remaining antenna elements, and obtaining a first set of corresponding number of measurement values.

The method 20 comprises repeating 23 the transmitting 21 and measuring 22 at least for a second reference antenna element different than the first reference antenna element, thereby obtaining a second set of corresponding number of measurement values.

The method 20 comprises calculating 24, for a first type of beamforming and for each calibration antenna element j a correction value $\Delta R_{ij}^{k, Type\ 1}$, based on the at least first and second sets of measurement values, thereby obtaining a first part of a correction matrix comprising for row i correction values for calibration antenna elements j relative antenna element k with antenna element i as the reference antenna element.

The method 20 comprises calculating 25, for a second type of beamforming and for each branch j a correction value $\Delta R_{i,j}^{Type\ 2}$, based on the at least first and second sets of measurement values, thereby obtaining a second part of the correction matrix comprising for row i correction values for branch j with antenna element i as the reference antenna element.

The method 20 comprises performing 26 an optimization procedure using as input the correction matrix, wherein each column of the first part of the correction matrix, except one, is multiplied with a respective constant $c_i$, i={1, ..., N} (N being equal to the number of branches) and each column of the second part of the correction matrix is multiplied with a respective constant $c_i$, i={N+1, ..., 2N} thereby obtaining, for each row of the correction matrix, a respective optimized constant $c_i^{opt}$.

The method 20 comprises calculating 27 a compensation value $\Delta r_i$ for each antenna element based on the respective optimized constant $c_i^{opt}$.

The method 20 brings about many advantages. For instance, the method 20 enables calibration for different types of beamforming types, e.g. enables calibration of both standard beamforming and reciprocity beamforming. Further, the method 20 enables prioritization of the calibration accuracy between, for instance, standard beamforming and reciprocity beamforming.

In an embodiment, the measuring 22 the signal is performed for each of the antenna elements not selected as reference antenna element.

In another embodiment, the measuring 22 the signal is performed only for neighboring elements selected among the antenna elements not selected as reference antenna element.

In various embodiments, the calculating 24 the correction values $\Delta R_{ij}^{k, Type\ 1}$ for the first type of beamforming comprises calculating for correction antenna element j relative antenna element k the correction values according to:

$$\Delta R_{ij}^{k} = \frac{Y_{ki} \cdot S_{ji}}{S_{ki} \cdot Y_{ji}} \forall\ i \neq j, k,$$

wherein $S_{ij}$, $S_{ik}$ is a coupling matrix obtained based on the at least first and second sets of measurement values, and $Y_{ik}$, $Y_{ij}$ is the signal transmitted from reference antenna element i and received at antenna elements k and j, respectively.

In various embodiments, the calculating 25 the correction values $\Delta R_{ij}^{Type\ 2}$ for the second type of beamforming comprises calculating for correction branch j using element i as reference element, the correction values according to:

$$\Delta R_{ij} = \frac{Y_{ij}}{Y_{ji}}, \forall\ i \neq j,$$

wherein $Y_{ij}$, $Y_{ji}$ is the signal transmitted from reference antenna element i and received at antenna element j, and transmitted from reference antenna element j, and received at antenna element i, respectively.

In various embodiments, the performing 26 the optimization procedure comprises performing a least square optimization using expression:

$$\min_{c_i, i=1 \ldots 2N} \left( \sum_{j=1}^{2N} \sum_{a,b=1}^{2N} |\Delta T_{aj} \cdot c_a - \Delta T_{bj} \cdot c_b|^2 \right),$$

wherein $\Delta T_{aj}$ is the correction value in downlink for element j relative element a.

In various embodiments, the calculating 27 the compensation value comprises calculating an averaged compensation value $\Delta r_i$ for each antenna element i by using equation:

$$\Delta r_i = \frac{\sum_{j=1}^{2N} \Delta RR_{ij} \cdot c_i^{opt}}{2N}$$

In various embodiments, the first type of beamforming is a standard beamforming and the second type of beamforming is a reciprocity based beamforming.

Figure 8:
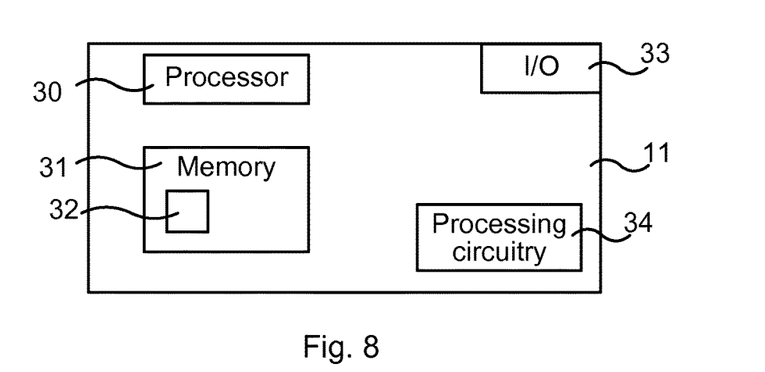
FIG. 8 illustrates schematically a control device and means for implementing embodiments of the method in accordance with the present teachings.

FIG. 8 illustrates schematically a control device and means for implementing embodiments of the method in accordance with the present teachings.

The control device 11 comprises a processor 30 comprising any combination of one or more of a central processing unit (CPU), multiprocessor, microcontroller, digital signal processor (DSP), application specific integrated circuit etc. capable of executing software instructions stored in a memory 31 which can thus be a computer program product. The processor 30 can be configured to execute any of the various embodiments of the method 20 for instance as described in relation to FIG. 7.

The memory 31 of the control device 11 can be any combination of read and write memory (RAM) and read only memory (ROM), Flash memory, magnetic tape, Compact Disc (CD)-ROM, digital versatile disc (DVD), Blu-ray disc etc. The memory 31 may also comprise persistent storage, which, for example, can be any single one or combination of magnetic memory, optical memory, solid state memory or even remotely mounted memory.

The control device 11 may comprise an interface 33 for communication with other devices. The interface 33 may, for instance, comprise a protocol stack, for communication with other devices or entities. The interface may be an input/output device, and be used for receiving data input and for outputting data.

The control device 11 may comprise additional processing circuitry, schematically indicated at reference numerals 34 for implementing the various embodiments according to the present teachings.

A control device 11 is provided for calibrating an antenna system 10 comprising a number of antenna elements. The control device 11 is configured to:
transmit a signal from a first reference antenna element selected among the antenna elements,
measure the signal in two or more calibration antenna elements selected among the remaining antenna elements, and obtaining a first set of corresponding number of measurement values,
repeat the transmitting 21 and measuring 22 at least for a second reference antenna element different than the first reference antenna element, thereby obtaining a second set of corresponding number of measurement values,
calculate, for a first type of beamforming and for each calibration antenna element j a correction value $\Delta R_{ij}^{k, Type\ 1}$, based on the at least first and second sets of measurement values, thereby obtaining a first part of a correction matrix comprising for row i correction values for calibration antenna elements j relative antenna element k with antenna element i as the reference antenna element,
calculate, for a second type of beamforming and for each branch j a correction value $\Delta R_{i,j}^{Type\ 2}$, based on the at least first and second sets of measurement values, thereby obtaining a second part of the correction matrix comprising for row i correction values for branch j with antenna element i as the reference antenna element,
perform an optimization procedure using as input the correction matrix, wherein each column of the first part of the correction matrix, except one, is multiplied with a respective constant $c_i$, i={1, ..., N} and each column of the second part of the correction matrix is multiplied with a respective constant $c_i$, i={N+1, ..., 2N} thereby obtaining, for each row of the correction matrix, a respective optimized constant $c_i^{opt}$, and
calculate a compensation value $\Delta r_i$ for each antenna element based on the respective optimized constant $c_i^{opt}$.

The control device 11 may be configured to perform the above steps e.g. by comprising one or more processors 30 and memory 31, the memory 31 containing instructions executable by the processor 30, whereby the control device 11 is operative to perform the steps. That is, in an embodiment, a control device 11 is provided for calibrating an antenna system 10 comprising a number of antenna elements. The control device 11 comprises one or more processors 30 and memory 31, the memory 31 containing instructions executable by the processor 30, whereby the control device 11 is operative to: transmit a signal from a first reference antenna element selected among the antenna elements; measure the signal in two or more calibration antenna elements selected among the remaining antenna elements, and obtaining a first set of corresponding number of measurement values; repeat the transmitting and measuring at least for a second reference antenna element different than the first reference antenna element, thereby obtaining a second set of corresponding number of measurement values; calculate, for a first type of beamforming and for each calibration antenna element j a correction value $\Delta R_{ij}^{k, Type\ 1}$, based on the at least first and second sets of measurement values, thereby obtaining a first part of a correction matrix comprising for row i correction values for calibration antenna elements j relative antenna element k with antenna element i as the reference antenna element; calculate, for a second type of beamforming and for each branch j a correction value $\Delta R_{i+1,j}^{Type\ 2}$, based on the at least first and second sets of measurement values, thereby obtaining a second part of the correction matrix comprising for row i correction values for branch j with antenna element i as the reference antenna element; perform an optimization procedure using as input the correction matrix, wherein each column of the first part of the correction matrix, except one, is multiplied with a respective constant $c_i$, and each column of the second part of the correction matrix is multiplied with a respective constant $c_{i+1}$, thereby obtaining, for each row of the correction matrix, a respective optimized constant $c_i^{opt}$; and calculate a compensation value $\Delta r_i$ for each antenna element based on the respective optimized constant $c_i^{opt}$.

In an embodiment, the control device 11 is configured to measure the signal for each of the antenna elements not selected as reference antenna element.

In an embodiment, the control device 11 is configured to measure the signal only for neighboring elements selected among the antenna elements not selected as reference antenna element.

In various embodiments, the control device 11 is configured to calculate the correction values $\Delta R_{ij}^{k, Type\ 1}$ for the first type of beamforming by calculating for correction antenna element j relative antenna element k the correction values according to:

$$\Delta R_{ij}^k = \frac{Y_{ki} \cdot S_{ji}}{S_{ki} \cdot Y_{ji}} \forall\, i \neq j, k,$$

wherein $S_{ij}$, $S_{ik}$ is a coupling matrix obtained based on the at least first and second sets of measurement values, and $Y_{ik}$, $Y_{ij}$ is the signal transmitted from reference antenna element i and received at antenna elements k and j, respectively.

In various embodiments, the control device 11 is configured to calculate the correction values $\Delta R_{ij}^{Type\ 2}$ for the second type of beamforming by calculating for correction branch j using element i as reference element, the correction values according to:

$$\Delta R_{ij} = \frac{Y_{ij}}{Y_{ji}},\ \forall\, i \neq j,$$

wherein $Y_{ij}$, $Y_{ji}$ is the signal transmitted from reference antenna element i and received at antenna element j, and transmitted from reference antenna element j, and received at antenna element i, respectively.

In various embodiments, the control device 11 is configured to perform the optimization procedure comprises performing a least square optimization by using expression:

$$\min_{c_i, i=1\ \ldots\ 2N} \left( \sum_{j=1}^{2N} \sum_{a,b=1}^{2N} |\Delta T_{aj} \cdot c_a - \Delta T_{bj} \cdot c_b|^2 \right),$$

wherein $\Delta T_{aj}$ is the correction value in downlink for element j relative element a.

In various embodiments, the control device 11 is configured to calculate the compensation value by calculating an averaged compensation value $\Delta r_i$ for each antenna element i by using equation:

$$\Delta r_i = \frac{\sum_{j=1}^{2N} \Delta R R_{ij} \cdot c_i^{opt}}{2N}$$

In various embodiments, the first type of beamforming is a standard beamforming and the second type of beamforming is a reciprocity based beamforming.

The present teachings also encompass a computer program 32 for a control device 11 for calibrating antenna systems. The computer program 32 comprises computer program code, which, when executed on at least one processor on the control device 11, causes the control device 11 to perform the method 20 according to any of the described embodiments.

The present teachings also encompass computer program products 31 for a control device 11. The computer program product 31 comprises the computer program 32 for implementing the embodiments of the methods as described, and a computer readable means on which the computer program 32 is stored. The computer program product, or the memory, thus comprises instructions executable by the processor 30. Such instructions may be comprised in a computer program, or in one or more software modules or function modules. The computer program product 31 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 9:
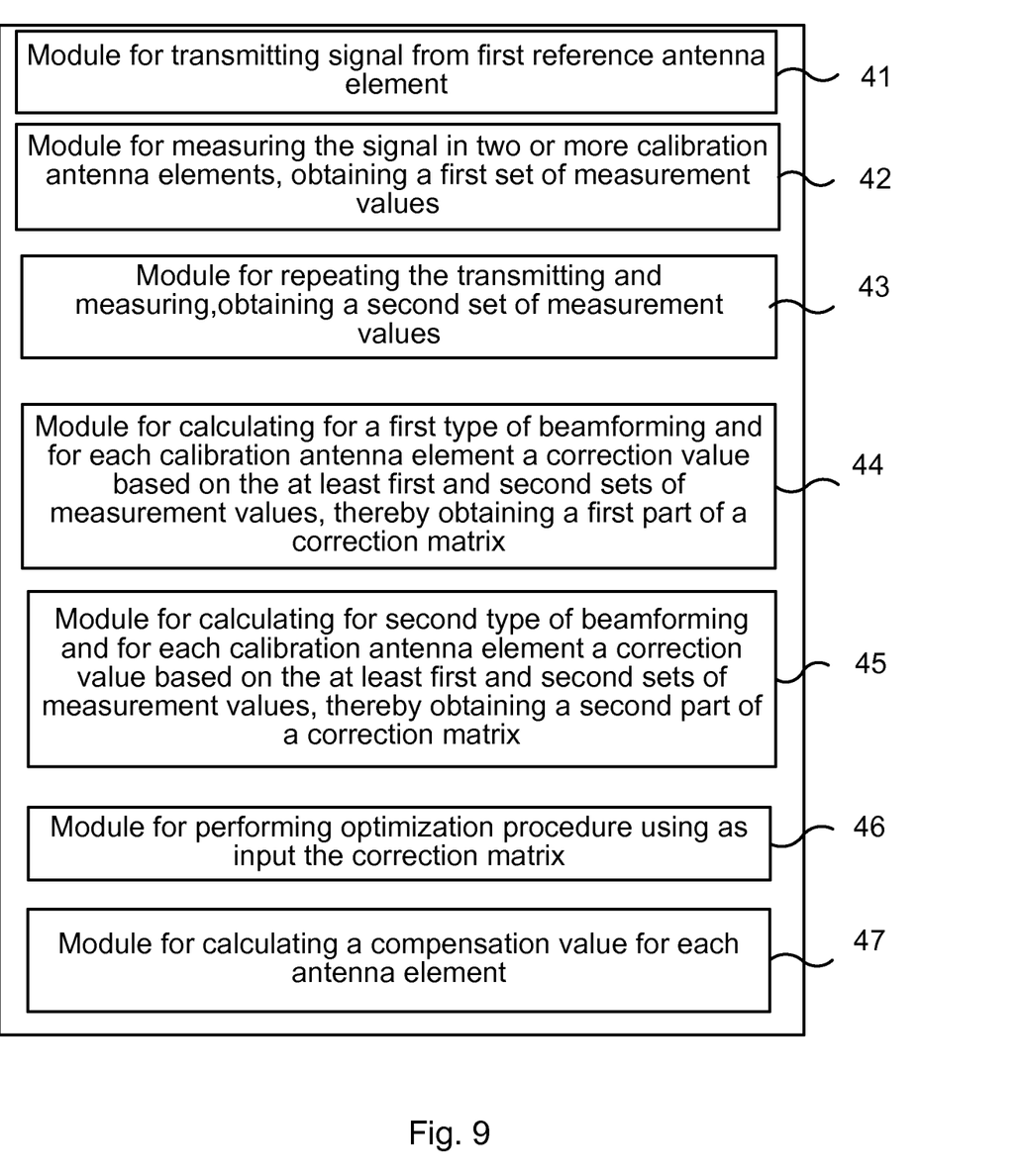
FIG. 9 illustrates a control device comprising function modules/software modules for implementing embodiments of the present teachings.

FIG. 9 illustrates a control device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described in various embodiments.

A control device is provided for calibrating an antenna system comprising a number of antenna elements. The control device comprises a first module 41 for transmitting a signal from a first reference antenna element selected among the antenna elements. Such first module 41 may, for instance, comprise transmitting circuitry.

The control device comprises a second module 42 for measuring the signal in two or more calibration antenna elements selected among the remaining antenna elements, and obtaining a first set of corresponding number of measurement values. Such second module 42 may, for instance, comprise processing circuitry adapted to perform measurements on a signal.

The control device comprises a third module 43 for repeating the transmitting and measuring at least for a second reference antenna element different than the first reference antenna element, thereby obtaining a second set of corresponding number of measurement values. Such third module 43 may comprise processing circuitry adapted for repeating the transmitting and measuring.

The control device comprises a fourth module 44 for calculating, for a first type of beamforming and for each calibration antenna element j a correction value $\Delta R_{ij}^{k,Type\ 1}$, based on the at least first and second sets of measurement values, thereby obtaining a first part of a correction matrix comprising for row i correction values for calibration antenna elements j relative antenna element k with antenna element i as the reference antenna element. Such fourth module 44 may, for instance, comprise processing circuitry for performing such calculations.

The control device comprises a fifth module 45 for calculating, for a second type of beamforming and for each branch j a correction value $\Delta R_{i,j}^{Type\ 2}$, based on the at least first and second sets of measurement values, thereby obtaining a second part of the correction matrix comprising for row i correction values for branch j with antenna element i as the reference antenna element. Such fifth module 45 may, for instance, comprise processing circuitry for performing such calculations.

The control device comprises a sixth module 46 for performing an optimization procedure using as input the correction matrix, wherein each column of the first part of the correction matrix, except one, is multiplied with a respective constant $c_i$, $i=\{1, \ldots, N\}$ and each column of the second part of the correction matrix is multiplied with a respective constant $c_i$, $i=\{N+1, \ldots, 2N\}$ thereby obtaining, for each row of the correction matrix, a respective optimized constant $c_i^{opt}$. Such sixth module 46 may, for instance, comprise processing circuitry for performing an optimization procedure.

The control device comprises a seventh module 47 for calculating a compensation value $\Delta r_i$ for each antenna element based on the respective optimized constant $c_i^{opt}$. Such seventh module 47 may, for instance, comprise processing circuitry for performing such calculations.

It is noted that one or more of the modules 41, 42, 43, 44, 45, 46, 47 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of calibrating an antenna system comprising a number of antenna elements, the method being performed in a control device and comprising:

transmitting a signal from a first reference antenna element selected among the number of antenna elements, measuring the signal in two or more calibration antenna elements selected among remaining antenna elements of the number of antenna elements, and obtaining a first set of corresponding number of measurement values, repeating the transmitting and measuring at least for a second reference antenna element selected among the number of antenna elements and different than the first reference antenna element, thereby obtaining a second set of corresponding number of measurement values, calculating, for a first type of beamforming and for each calibration antenna element j a correction value $\Delta R_{ij}^{k, Type\ 1}$, based on at least the first set of corresponding number of measurement values and the second set of corresponding number of measurement values, thereby obtaining a first part of a correction matrix comprising for row i correction values for calibration antenna elements j relative to antenna element k with antenna element i being one of the first reference antenna element or the second reference antenna element, calculating, for a second type of beamforming and for each branch j a correction value $\Delta R_{i,j}^{Type\ 2}$, based on at least the first set of corresponding number of measurement values and the second set of corresponding number of measurement values, thereby obtaining a second part of the correction matrix comprising for row i correction values for branch j with antenna element i being one of the first reference antenna element and the second reference antenna element, performing an optimization procedure using as input the correction matrix, wherein each column of the first part of the correction matrix, except one, is multiplied with a first respective constant $c_i$, $i=\{1, \ldots, N\}$ and each column of the second part of the correction matrix is multiplied with a second respective constant $c_i$, $i=\{N+1, \ldots, 2N\}$ thereby obtaining, for each row of the correction matrix, a respective optimized constant $c_i^{opt}$, and calculating a compensation value $\Delta r_i$ for each antenna element based on the respective optimized constant $c_i^{opt}$.

2. The method as claimed in claim 1, wherein the measuring of the signal is performed for each of the number of antenna elements not selected as the first reference antenna element when the signal is transmitted from the first reference antenna element or not selected as the second reference antenna element when the signal is transmitted from the second reference antenna element.

3. The method as claimed in claim 1, wherein the measuring the signal is performed only for neighboring elements selected among the number of antenna elements not selected as the first reference antenna element when the signal is transmitted from the first reference antenna element or not selected as the second reference antenna element when the signal is transmitted from the second reference antenna element.

4. The method as claimed in claim 1, wherein the calculating of the correction value $\Delta R_{ij}^{k, Type\ 1}$ for the first type of beamforming comprises calculating for correction antenna element j relative to antenna element k the correction value $\Delta R_{ij}^{k, Type\ 1}$ according to:

$$\Delta R_{ij}^{k} = \frac{Y_{ki} \cdot S_{ji}}{S_{ki} \cdot Y_{ji}}, \forall\ i \neq j, k,$$

wherein $S_{ij}$, $S_{ik}$ is a coupling matrix obtained based on at least the first set of corresponding number of measurement values and the second set of corresponding number of measurement values, and $Y_{ik}$, $Y_{ij}$ is the signal transmitted from reference antenna element i and received at antenna elements k and j, respectively.

5. The method as claimed in claim 1, wherein the calculating of the correction value $\Delta R_{ij}^{Type\ 2}$ for the second type of beamforming comprises calculating for correction branch j using element i as reference element, the correction value $\Delta R_{ij}^{Type\ 2}$ according to:

$$\Delta R_{ij} = \frac{Y_{ij}}{Y_{ji}}, \forall\ i \neq j,$$

wherein $Y_{ij}$, $Y_{ji}$ is the signal transmitted from reference antenna element i and received at antenna element j, and transmitted from reference antenna element j, and received at antenna element i, respectively.

6. The method as claimed in claim 1, wherein the performing of the optimization procedure comprises performing a least square optimization comprises using expression:

$$\min_{c_i, i=1 \ldots 2N} \left( \sum_{j=1}^{2N} \sum_{a,b=1}^{2N} |\Delta T_{aj} \cdot c_a - \Delta T_{bj} \cdot c_b|^2 \right),$$

wherein $\Delta T_{aj}$ is the correction value in downlink for element j relative to element a.

7. The method as claimed in any claim 1, wherein the calculating of the compensation value comprises calculating an averaged compensation value $\Delta r_i$ for each antenna element i by using equation:

$$\Delta r_i = \frac{\sum_{j=1}^{2N} \Delta RR_{ij} \cdot c_i^{opt}}{2N}.$$

8. The method as claimed in claim 1, wherein the first type of beamforming is a standard beamforming and the second type of beamforming is a reciprocity based beamforming.

9. A non-transitory computer readable medium having a computer program stored thereon, the computer program for a control device for calibrating an antenna system, the computer program comprising computer program code, which, when executed on at least one processor on the control device causes the control device to perform the method according to claim 1.

10. A control device for calibrating an antenna system comprising a number of antenna elements, the control device being configured to:
- transmit a signal from a first reference antenna element selected among the number of antenna elements,
- measure the signal in two or more calibration antenna elements selected among remaining antenna elements of the number of antenna elements, and obtaining a first set of corresponding number of measurement values,
- repeat the transmit and the measure at least for a second reference antenna element selected among the number of antenna elements and different than the first reference antenna element, thereby obtaining a second set of corresponding number of measurement values,
- calculate, for a first type of beamforming and for each calibration antenna element j a correction value $\Delta R_{ij}^{k,\text{Type 1}}$, based on at least the first set of corresponding number of measurement values and the second set of corresponding number of measurement values, thereby obtaining a first part of a correction matrix comprising for row i correction values for calibration antenna elements j relative to antenna element k with antenna element i being one of the first reference antenna element or the second reference antenna element,
- calculate, for a second type of beamforming and for each branch j a correction value $\Delta R_{i,j}^{\text{Type 2}}$, based on at least the first set of corresponding number of measurement values and the second set of corresponding number of measurement values, thereby obtaining a second part of the correction matrix comprising for row i correction values for branch j with antenna element i being one of the first reference antenna element and the second reference antenna element,
- perform an optimization procedure using as input the correction matrix, wherein each column of the first part of the correction matrix, except one, is multiplied with a first respective constant $c_i$, i={1, . . . , N} and each column of the second part of the correction matrix is multiplied with a second respective constant $c_i$, i={N+1, . . . , 2N} thereby obtaining, for each row of the correction matrix, a respective optimized constant $c_i^{opt}$, and
- calculate a compensation value $\Delta r_i$ for each antenna element based on the respective optimized constant $c_i^{opt}$.

11. The control device as claimed in claim 10, configured to measure the signal for each of the number of antenna elements not selected as the first reference antenna element when the signal is transmitted from the first reference antenna element or not selected as the second reference antenna element when the signal is transmitted from the second reference antenna element.

12. The control device as claimed in claim 10, configured to measure the signal only for neighboring elements selected among the number of antenna elements not selected as the first reference antenna element when the signal is transmitted from the first reference antenna element or not selected as the second reference antenna element when the signal is transmitted from the second reference antenna element.

13. The control device as claimed in claim 10, configured to calculate the correction value $\Delta R_{ij}^{k,\text{Type 1}}$ for the first type of beamforming by calculating for correction antenna element j relative to antenna element k the correction value $\Delta R_{ij}^{k,\text{Type 1}}$ according to:

$$\Delta R_{ij}^k = \frac{Y_{ki} \cdot S_{ji}}{S_{ki} \cdot Y_{ji}}, \forall i \neq j, k,$$

wherein $S_{ij}$, $S_{ik}$ is a coupling matrix obtained based on at least the first set of corresponding number of measurement values and the second set of corresponding number of measurement values, and $Y_{ik}$, $Y_{ij}$ is the signal transmitted from reference antenna element i and received at antenna elements k and j, respectively.

14. The control device as claimed in claim 10, configured to calculate the correction value $\Delta R_{ij}^{\text{Type 2}}$ for the second type of beamforming by calculating for correction branch j using element i being one of the first reference antenna element and the second reference antenna element, the correction value $\Delta R_{ij}^{\text{Type 2}}$ according to:

$$\Delta R_{ij} = \frac{Y_{ij}}{Y_{ji}}, \forall i \neq j,$$

wherein $Y_{ij}$, $Y_{ji}$ is the signal transmitted from reference antenna element i and received at antenna element j, and transmitted from reference antenna element j, and received at antenna element i, respectively.

15. The control device as claimed in claim 10, configured to perform the optimization procedure by performing a least square optimization by using expression:

$$\min_{c_i, i=1\ldots 2N} \left( \sum_{j=1}^{2N} \sum_{a,b=1}^{2N} |\Delta T_{aj} \cdot c_a - \Delta T_{bj} \cdot c_b|^2 \right),$$

wherein $\Delta T_{aj}$ is the correction value in downlink for element j relative to element a.

16. The control device as claimed in claim 10, configured to calculate the compensation value by calculating an averaged compensation value $\Delta r_i$ for each antenna element i by using equation:

$$\Delta r_i = \frac{\sum_{j=1}^{2N} \Delta RR_{ij} \cdot c_i^{opt}}{2N}.$$

17. The control device as claimed in claim 10, wherein the first type of beamforming is a standard beamforming and the second type of beamforming is a reciprocity based beamforming.

* * * * *